Aug. 21, 1934.   O. EPPENSTEIN   1,971,066
TELESCOPE FOR OBSERVING STRONG SOURCES OF LIGHT
Filed Nov. 19, 1932
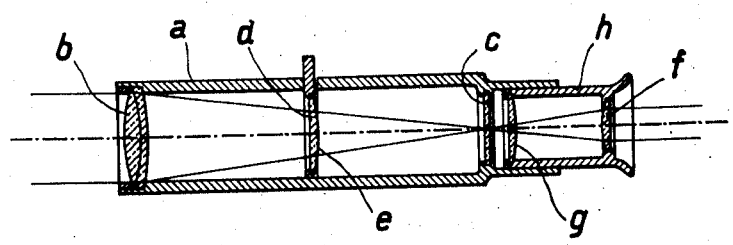
Inventor:
Otto Eppenstein Patented Aug. 21, 1934

1,971,066

UNITED STATES PATENT OFFICE 1,971,066

TELESCOPE FOR OBSERVING STRONG SOURCES OF LIGHT

Otto Eppenstein, Jena, Germany, assignor to the firm Carl Zeiss, Jena, Germany

Application November 19, 1932, Serial No. 643,356
In Germany November 26, 1931

2 Claims. (Cl. 88—32)

I have filed applications in Germany, November 26, 1931, and in Italy, April 25, 1932.

When observing by means of a telescope a strong source of light, for instance a searchlight, the experienced dazzling sensation is generally realized as extremely disturbing, and no less the strong reflexes that arise in the interior of the telescope and prevent the observer from seeing the image as distinctly as necessary. To obviate these inconveniences, use has been made of highly absorbing glasses, which are generally positioned near the ocular of the telescope.

The invention, which aims at overcoming the said disadvantages by reducing the intensity of the light source image relatively to the remaining image field, provides that the light is diffused instead of absorbed, a diffusion being effected by so frosting at least one surface of an optical member of the telescope that part of the imaging rays are directed through the said surface, and part diffusely dispersed. The frosting, which, obviously, is to be comparatively weak only, brightens the entire image field, and this because part of the rays emanating from the observed source of light are not directed to the light source image, but diffused. As a rule, the surrounding of the source of light is not strongly illuminated and, as a consequence, the image of this surrounding is not seen very distinctly. Nevertheless, this is of no importance, since, generally, nothing else but the image of the source of light will be required. The said light dispersion, however, offers the positive advantage of marks eventually used in the image field not requiring any special source of light.

The frosted surface may have any desired position in the telescope. A frosting may be provided on one or the two surfaces of the objective, or on any other surface or surfaces in the telescope, for instance on the surfaces of a planoparallel plate disposed in front of the objective or on that surface of a plano-parallel mark plate which faces the objective and does not represent the image plane. Nevertheless, it is advisable to provide in the optical system of the telescope, between objective and objective image plane, a converging lens which is displaceable and has at least one frosted surface. To enable the telescope being used also without any frosted surface, the said lens is to have a thickness and to produce such a converging effect that the position of the objective image plane is not altered when the lens is inserted into the ray path.

The accompanying drawing represents in central section a constructional example of a telescope according to the invention. The telescope has a tube $a$ in the front end of which is disposed an objective $b$. In the rear image plane of this objective $b$ is positioned that surface of a planoparallel mark plate $c$ which does not face the objective. A converging lens $d$ is provided between these two members in a slot in the telescope tube $a$. The surface $e$ of this lens $d$, which does not face the objective, is slightly frosted. The lens $d$ has such a thickness and curvature that it does not prevent the objective image plane from lying in that surface of the mark plate $c$ which does not face the objective $b$. The telescope tube $a$ is elongated over the mark plate $c$, this elongation housing an adjustable ocular $h$ which consists of an eye lens $f$ and a field lens $g$.

Like any other of the usual telescopes, the telescope according to the invention may be used without the lens $d$. When strong sources of light are to be viewed, the lens $d$ is inserted into the telescope tube $a$, and the disadvantages caused by strong reflexes in the interior of the telescope as well as the inconvenient dazzling of the observer are not to be feared any longer, the difference of the intensities of the image of the light source and the remaining image field being reduced.

I claim:

1. A telescope for observing strong sources of light, the telescope containing optical members and being adapted to present to the observer an image of the source of light, at least one surface of one of the said optical members lying in front of the image plane and being slightly frosted in such a manner that part of the rays traversing the said surface are diffusely dispersed.

2. A telescope for observing strong sources of light, the telescope containing an objective adapted to project an image of the source of light, an ocular for observing this image, and a converging lens removably disposed between the objective and the objective focal plane, this lens having such a thickness and producing such a converging effect that the position of the said image is not altered when the lens is removed, at least one surface of this lens being frosted in such a manner that part of the rays traversing the said surface are diffusely dispersed.

OTTO EPPENSTEIN.